June 21, 1955
F. M. MATHENY
2,711,000
PIPE LINING DRAG DEVICE
Filed May 12, 1952
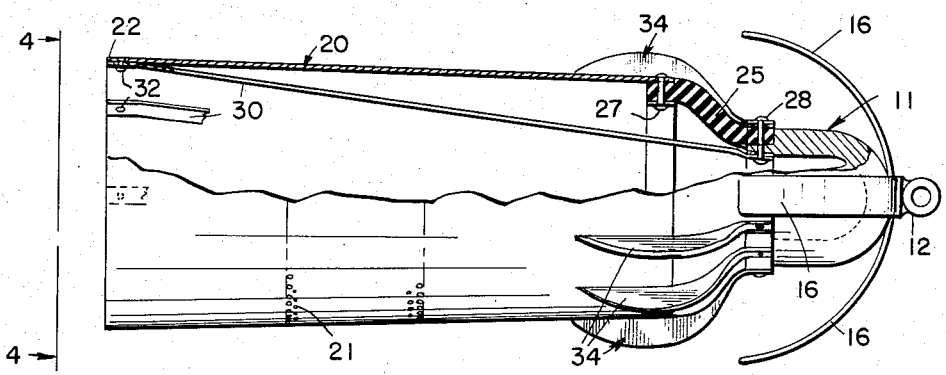
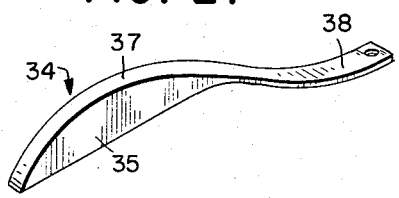
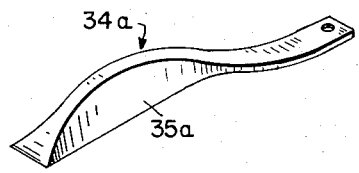
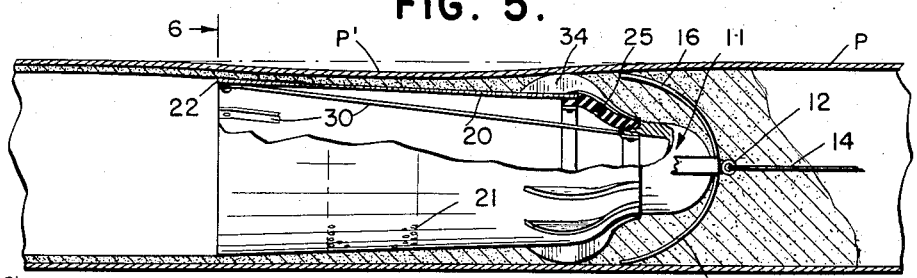
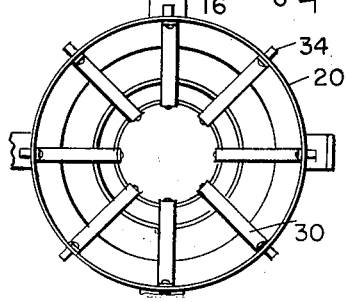
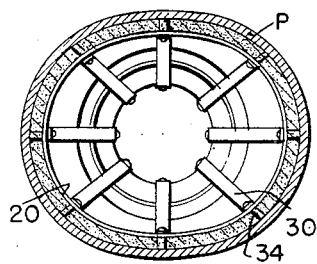
INVENTOR
FRANCIS M. MATHENY
BY
*Mason & Graham*
ATTORNEYS United States Patent Office 2,711,000
Patented June 21, 1955

2,711,000

PIPE LINING DRAG DEVICE

Francis M. Matheny, Lynwood, Calif., assignor to Pipe Linings, Inc., a corporation of Delaware Application May 12, 1952, Serial No. 287,298

9 Claims. (Cl. 25—38)

This invention has to do generally with apparatus for lining pipe in place with cementitious material and particularly with the type of device which is pulled through the pipe and functions to evenly spread the lining material, placed in the pipe ahead of the device, over the inner surface of the pipe.

Pipe is often lined in place by charging the pipe with cementitious material and pulling a spreader device through the pipe to distribute the lining material evenly over the pipe wall. Such devices usually embody a trailing skirt portion having a maximum diameter such as to leave a desired thickness of lining material on the pipe wall. Great difficulty has been experienced with such devices because the pipe is often out of round due to heavy earth loads thereon and from other causes. Although the skirts of the spreader devices are flexible, they do not readily tend to conform to the cross-sectional shape of the pipe. Also, where the pipe is deformed, there is a marked tendency for the forward part of the skirt to get out of center thereby restricting flow of the cementitious material past the skirt on one side. As a result, the lining material is not evenly spread, causing thin spots or areas in the lining. I am aware that various means have been devised in an attempt to overcome these difficulties, but so far as I know, these means have not proved successful.

It is an object of my invention to provide novel and improved apparatus of the type indicated which does not have the above-noted disadvantages of devices presently used.

A particular object of the invention is to provide a pipe lining device having novel means for causing the skirt portion of the device to be centered in the pipe and to follow the contour and cross-sectional shape of the pipe as where the same is distorted to out-of-round shapes.

Another object of the invention is to provide a lining device of the type indicated which embodies a rigid nose section and a trailing, flexible skirt section which are joined by a highly flexible or elastic connecting section, together with means mounted on the nose section and adapted to contact the inner wall of the pipe which functions to tend to cause the skirt section to be centered in and take the shape of the pipe being lined.

Another object is to provide a simple, durable device which can be readily manufactured.

These and other objects will be apparent from the drawing and the following description.

Referring to the drawing:

Fig. 1 is a view, partly in section and partly in elevation, of a device embodying the invention;

Fig. 2 is a perspective view of one of the skid members;

Fig. 3 is a perspective view of a modified form of skid member;

Fig. 4 is a view on line 4—4 of Fig. 1;

Fig. 5 is a view showing the device being pulled through a pipe, the latter being shown in section; and Fig. 6 is a section on line 6—6 of Fig. 5.

More particularly describing the invention, numeral 11 indicates the nose of the device and this may be formed of a heavy, cup-like member which is fitted with an eye or ring bolt 12 for the purpose of affording a means of connecting a cable 14 used to draw the device through a pipe. In the form of the invention shown, the ring bolt also serves as a means of attaching guide springs 16 which ride upon the inner surface of the pipe and serve to keep the nose section 11 centered in the pipe.

I provide a relatively thin-walled skirt 20 which may have a perforated area 21 having a plurality of dehydrating openings therein. The skirt, which is circular in cross section, may be described as tapering slightly from its smallest diameter at the forward end to its largest diameter at the trailing edge or rearward end 22.

While the skirt and nose are shown on the drawing as being made of metal, other materials can be used, such as various plastics.

It is a feature of my invention that I provide a flexible connecting section 25 between the nose and the skirt and this section should be formed of rubber, synthetic rubber, or a resilient material. The parts may be secured by means of rivets 27 and 28. In order to eliminate any axial strain on the member 25, I connect the nose section 11 and the skirt 20 with a plurality of draw bars 30 which can be thin metal straps. For convenience, these straps are secured at their forward end by the rivets 28 and are attached to the skirt near the end thereof by means of rivets 32.

I also provide a plurality of skid members 34. These members each comprise a main body portion 35 having a flat inner surface to bear against the skirt and a curved or arcuate outer surface or edge 37. The skid members include a spring section 38 which projects forwardly of the body 35 and is secured to the nose of the device by any suitable means as by the aforementioned rivets 28.

Several of the skid members are employed spaced circumferentially about the device. These members are designed to have a width such that they will slidably ride within the wall of the pipe being lined, making sliding contact therewith as the device is pulled through the pipe in a lining operation. Also, the total cross-sectional area of the skid members is preferably made such that the cross-sectional area of the combined spaces between the skid members will approximately equal the cross-sectional area of the space around the skirt at the region of maximum diameter of the skirt. Thus the correct amount of cementitious material for applying the desired thickness of the layer thereof upon the pipe wall is automatically metered.

In Fig. 2 I show the skid member 34 as having an even thickness. In Fig. 3 there is shown a modified form of skid member, indicated by 34a, wherein the body 35a is made thicker along its base where it rides against the skirt and tapers down to a thinner edge at its widest portion.

In the use of the device, a pipe P (Fig. 5) is charged with cementitious lining material and the device pulled through the pipe by means of the cable 14. During its movement through the pipe, the guide springs 16 tend to maintain the nose section centered in the pipe. At the same time, the skid members 34 also ride against the inner wall of the pipe. Since these latter members bear against the outer surface of the skirt, they cause the skirt to take the cross-sectional shape of the pipe as where it is distorted as shown at P' in Fig. 5 and further function to keep the skirt centered in the pipe. Also, the skid members serve to meter the correct amount of mortar or cementitious material to the rearward end of the skirt insuring even coating. It will be apparent that the connecting portion 25 provides a highly flexible elastic connection between the skirt and nose so that the skirt can readily be distorted to out-of-round shapes and can easily be centered in the pipe. Furthermore, the draw bars 30 serve to relieve the connecting section 25 of any axial strain or pulling force as the nose section is pulled through the pipe.

Although I have shown and described a preferred form of the invention, I contemplate that various changes and modifications can be made therein without departing from the scope of the invention which is indicated by the claims.

I claim:

1. A pipe lining device comprising a nose, a hollow flexible skirt, a flexible connecting section between said nose and skirt, and drawbar means connecting said nose and skirt, said drawbar means being attached to said skirt adjacent the trailing edge thereof.

2. A device as set forth in claim 1 in which said drawbar means comprises a plurality of strips connected at their forward ends to said nose and connected at their other ends to said skirt, said strips being spaced circumferentially of said nose and skirt.

3. A device as set forth in claim 1 in which said connecting section is annular and formed of a resilient material.

4. A pipe lining device comprising a nose, a hollow flexible skirt of circular cross section, an annular flexible connection means between said skirt and said nose, drawbar means connecting said nose and skirt, and a plurality of skid members mounted at one end on said nose in circumferentially spaced relation, said members extending rearwardly from the nose and bearing upon the outer surface of said skirt, said skid bars being sufficiently wide normally to engage the inner surface of the pipe being lined.

5. A pipe lining device as set forth in claim 4 in which said flexible connection means includes an annular resilient member.

6. A device as set forth in claim 4 in which said drawbar means comprises a plurality of strips connected at their forward ends to said nose and connected at their other ends to said skirt, said strips being spaced circumferentially of said nose and skirt.

7. A pipe lining device comprising a nose having means for attachment of a cable, a frustro-conical hollow skirt member flexible to various cross-sectional shapes, an annular resilient member between said nose and said skirt member attached to the rearward portion of the nose and the forward portion of the skirt, a plurality of circumferentially spaced straps connected to said nose at their forward ends and connected to said skirt at their other ends, and a plurality of skid members mounted at one end on said nose in circumferentially spaced relation, said members extending rearwardly from the nose and bearing upon the outer surface of said skirt, said skid members being sufficiently wide normally to engage the pipe being lined.

8. In a pipe lining device, a nose, a flexible skirt, an annular flexible connecting member between said nose and skirt, and a plurality of skid members attached to said nose and bearing on the outer surface of said skirt, said skid members being circumferentially spaced about said nose and skirt and being sufficiently wide in the region of said skirt normally to engage the inner surface of a pipe being lined.

9. In a pipe lining device, a nose, a flexible tapered skirt of circular cross section having a maximum cross-section at its trailing end approximately the same size as the required finish bore of a pipe when lined, an annular flexible connecting means between said nose and skirt, and a plurality of skid members attached to said nose and bearing on the outer surface of said skirt, said skid members being circumferentially spaced about said nose and skirt and being sufficiently wide in the region of said skirt normally to engage the inner surface of a pipe being lined, the cross-sectional area of said skid members being such as to provide a cross-sectional area of material-passing space therebetween substantially equal to the cross-sectional area of the space between said skirt and the pipe wall at the maximum diameter of the skirt.

References Cited in the file of this patent

UNITED STATES PATENTS

| 668,122 | Radspinner | Feb. 12, 1901 |
| 2,555,377 | Scott | June 5, 1951 |

FOREIGN PATENTS

| 10,380 | Australia | Nov. 30, 1933 |